United States Patent
Kondo et al.

(10) Patent No.: US 6,371,078 B1
(45) Date of Patent: Apr. 16, 2002

(54) METHOD OF CONTROLLING A DIRECT FUEL INJECTION ENGINE AND STORAGE MEDIUM STORING THE SAME

(75) Inventors: Noriaki Kondo; Yasushi Sakakura, both of Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 56 days.

(21) Appl. No.: 09/642,668

(22) Filed: Aug. 22, 2000

(30) Foreign Application Priority Data

Aug. 23, 1999 (JP) .......................... 11-235386

(51) Int. Cl.⁷ .................... F02D 35/02; F02D 41/34
(52) U.S. Cl. .................. 123/305; 123/436; 123/480; 123/406.47
(58) Field of Search ................. 123/305, 295, 123/299, 300, 435, 436, 480, 406.27, 406.28, 406.47; 701/102, 103, 105

(56) References Cited

U.S. PATENT DOCUMENTS

| | | | | |
|---|---|---|---|---|
| 4,503,830 A | * | 3/1985 | Nakamura et al. | 123/501 |
| 5,343,844 A | * | 9/1994 | Fukui et al. | 123/481 |
| 5,878,717 A | * | 3/1999 | Zur Loye | 123/435 |
| 5,947,077 A | | 9/1999 | Yonezawa et al. | 123/295 |
| 6,032,650 A | * | 3/2000 | Rask | 123/435 |

FOREIGN PATENT DOCUMENTS

| | | | | |
|---|---|---|---|---|
| EP | 0 810 368 A2 | | 12/1997 | |
| EP | 1 079 087 A2 | * | 2/2001 | ........... F02D/35/02 |
| JP | 58-72626 | | 4/1983 | |
| JP | 59-43934 | * | 3/1984 | ........... F02D/5/02 |
| JP | 63-208647 | * | 8/1988 | ........... F02D/45/00 |
| JP | 1-155054 | | 6/1989 | |
| JP | 5-26097 | | 2/1993 | |
| JP | 6-33855 | | 2/1994 | |
| JP | 6-34490 | | 2/1994 | |
| JP | 8-144828 | * | 6/1996 | ........... F02D/45/00 |
| JP | 8-189392 | | 7/1996 | |
| JP | 9-303189 | | 11/1997 | |
| JP | 9-324675 | | 12/1997 | |
| JP | 10-331752 | | 12/1998 | |
| JP | 11-13620 | | 1/1999 | |
| JP | 11-50941 | | 2/1999 | |
| JP | 11-82149 | * | 3/1999 | ........... F02D/45/00 |
| JP | 11-294245 | | 10/1999 | |
| JP | 3046465 | | 3/2000 | |
| JP | 2000-80944 | | 3/2000 | |
| JP | 2001-59442 | * | 3/2001 | ........... F02D/41/02 |

* cited by examiner

*Primary Examiner*—John Kwon
*Assistant Examiner*—Hieu T. Vo
(74) *Attorney, Agent, or Firm*—Sughrue Mion, PLLC

(57) ABSTRACT

A method of controlling a direct fuel injection engine is provided. In the method, under a condition where an ignition timing which is accurately detectable is constant, a fuel injection timing is advanced and delayed to measure an average ion current, and the fuel injection timing is controlled so as to maximize the average ion current. Even when the efficiency of a solenoid is lowered to cause a variation of the fuel injection timing, the fuel injection timing can be controlled to be optimized, thus making it possible to maintain an intended efficiency of the direct fuel injection engine over a long period of usage. Particularly, the method can be realized by the use of a conventional ion current detecting device for detection of a misfire, it can be executed with an apparatus which can be attained at low cost. A direct fuel injection engine control system and a storage medium storing the control method of this invention are also provided.

11 Claims, 13 Drawing Sheets

METHOD OF CONTROLLING A DIRECT FUEL INJECTION ENGINE AND STORAGE MEDIUM STORING THE SAME

BACKGROUND OF THE INVENTION

The present invention relates to a learning control method for controlling a direct fuel injection engine wherein fuel such as gasoline is injected directly into each cylinder to be ignited by a spark plug. Further, the present invention relates to a storage medium storing such a learning control of a direct fuel injection engine.

A direct fuel injection engine wherein fuel such as gasoline is injected directly into each cylinder to be ignited by a spark plug is now put into a practical use. In such a direct fuel injection engine, reduction of the fuel consumption and making higher the output can be attained at the same time through adjustment of the fuel injection timing. In such a direct fuel injection engine, an electromagnetic solenoid is used for injecting fuel into each cylinder since it is necessitated to variably control a fuel injection timing according to an engine load. In order to spray fuel in a fine particle state into a pressurized space inside a cylinder, the electromagnetic solenoid is required to develop a high pressure of tens of atmospheric pressure at an accurate timing.

SUMMARY OF THE INVENTION

However, it is difficult to make the electromagnetic solenoid maintain such a high efficiency over a long period of use. To cope with this problem, the repair shops are provided with testing machines for exclusive use for direct fuel injection engines, which are capable of measuring a variation of the fuel injection timing so that the injection timing can be adjusted at regular intervals. However, this means that the direct fuel injection engine cannot maintain its intended efficiency unless it undergoes inspection at the factory provided with the testing machine for exclusive use.

It is accordingly an object of the present invention to provide a method for controlling a direct fuel injection engine, which can solve the above noted problem inherent in the prior art method.

It is a further object of the present invention to provide a control method of the foregoing character which enables a direct fuel injection engine to maintain its intended efficiency over a long period of use.

It is a further object of the present invention to provide a direct fuel injection engine control system for carrying out the control method of the foregoing character.

It is a further object of the present invention to provide a storage medium which stores the control method of the foregoing character.

To accomplish the above objects, the present invention provides a method of controlling a direct fuel injection engine with spark ignition, comprising, under a condition where an ignition timing is constant, varying a fuel injection timing, monitoring a combustion condition of each cylinder before and after the varying of the fuel injection timing, and controlling the fuel injection timing in accordance with a variation of the combustion condition before and after the varying of the fuel injection timing.

Control of the ignition timing is entirely electric and therefore can be accurate. In contrast to this, control of the fuel injection timing is partly mechanical since it is carried out by the use of an electromagnetic solenoid and therefore accurate control of the fuel injection timing is hard to be obtained. According to the present invention, at the time when the detectable ignition timing is constant, the fuel injection timing is not measured but advanced and delayed so as to optimize the combustion condition. Accordingly, even when the electromagnetic solenoid is deteriorated to lower its efficiency and cause a variation of the fuel injection timing, the fuel injection timing can be controlled so as to be optimized, thus making it possible to maintain an intended efficiency of the direct fuel injection engine over a long period of usage.

Particularly, in case ion current is used for detection of a combustion condition, a combustion control apparatus can be obtained at low cost.

The combustion condition can be detected not only by the current value of ion current but various characteristic parameters that are obtained from, for example, a waveform of the current value. The characteristic parameters include various parameters which are determined by an arithmetic processing or the like from an ion current waveform, for example, an integration value of an ion current waveform, a maximum value of a waveform (peak value of waveform) and an average integration value, average maximum value and a moving average of a plurality of ion current waveforms.

DESCRIPTION OF THE PREFERRED EMBODIMENTS

A method of controlling a direct fuel injection engine according to a first embodiment of the present invention will now be described with reference to the attached drawings.

Figure 1:
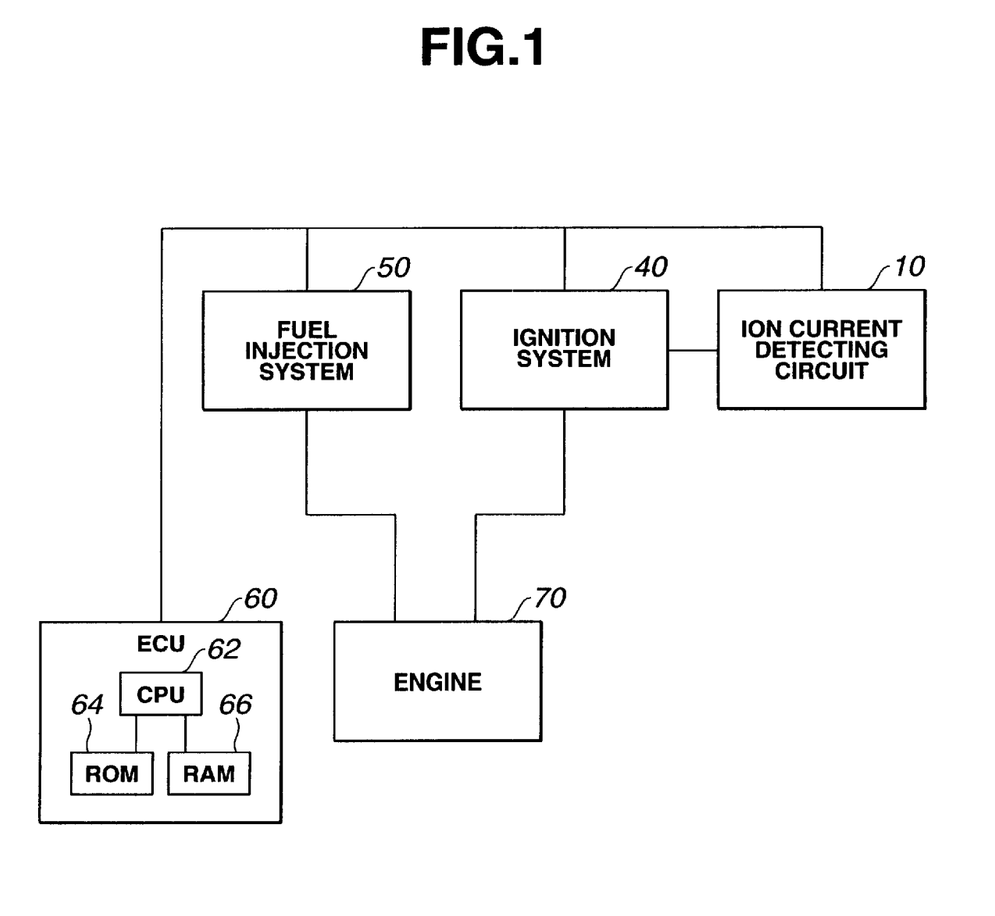
FIG. 1 is a block diagram of an engine system in which a control method of controlling a direct fuel injection engine according to an embodiment of the present invention is used.

FIG. 1 shows an engine system in which the control method according to the first embodiment is executed. A direct fuel injection engine with spark ignition is indicated by 70 and is controlled by an engine control unit 60. The engine control unit 60 includes a CPU (central processing unit) 62 for executing various operations, a ROM 64 storing various control programs including a learning control program which will be described hereinlater, and a RAM 66 used as a work area of the CPU 62. The engine control unit 60 controls a fuel injection system 50 which controls injection of gasoline into each cylinder of the engine 70 and an ignition system 50 which controls the ignition timing of a spark plug at each cylinder, for thereby optimizing the operation of the engine 70. The engine system includes an ion current detecting circuit 10 for detection of a misfire of each cylinder.

The engine control unit 60 controls the ignition timing, together with the fuel injection timing, on the basis of the signals from the ion current detecting circuit 10 and from, though not shown, coolant temperature sensor, exhaust gas sensor, engine speed sensor, etc. so as to optimize the ignition timing and the fuel injection timing.

Figure 6:
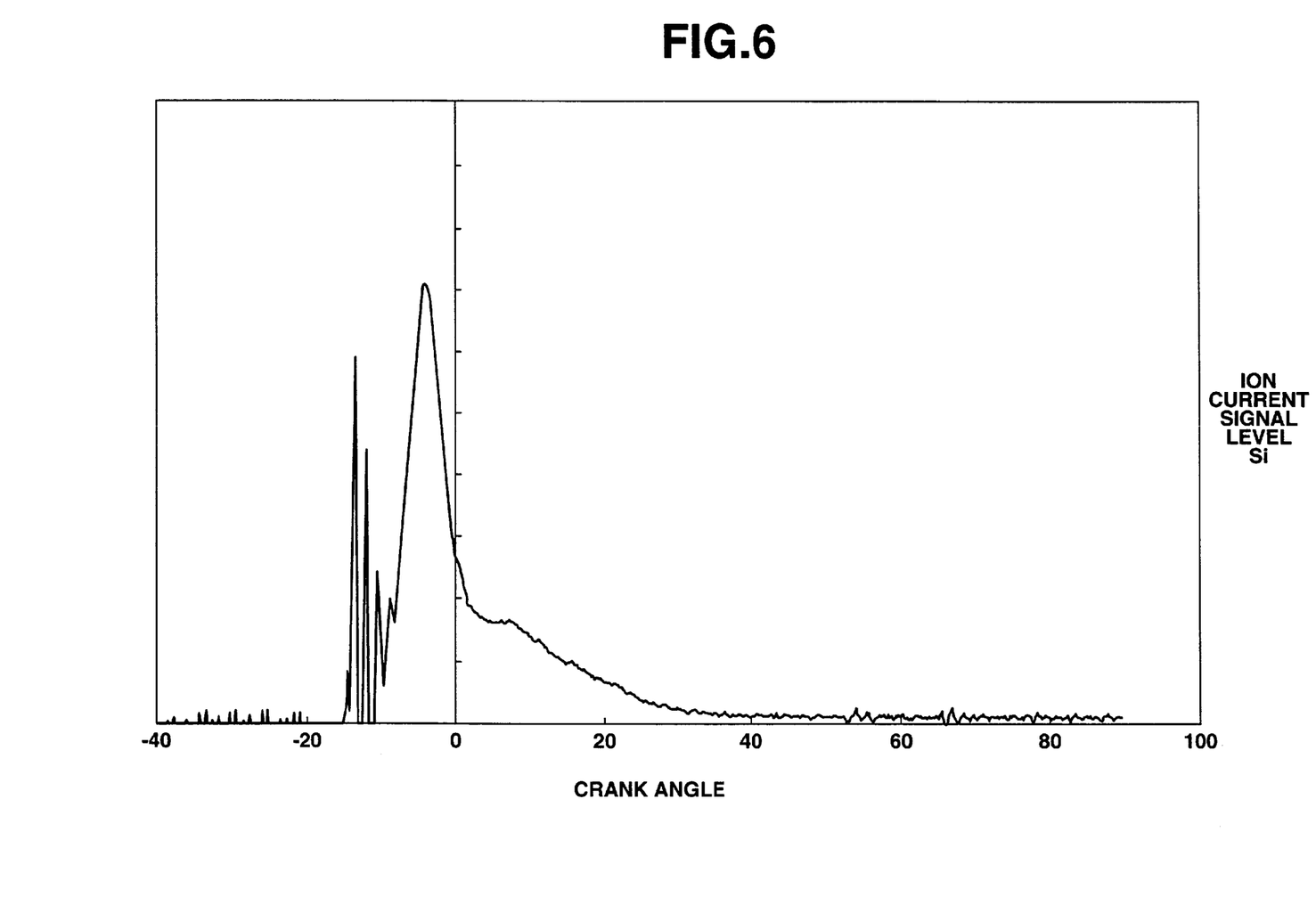
FIG. 6 is a graph of ion current in relation to crank angle.

FIG. 6 is a graph with the ion current signal level Si as ordinate and the crank angle as abscissa. The graph shows the value of the ion current resulting when an air-fuel mixture is ignited suitably. In case ion current is not generated due to a misfire, the ignition system 40 controls the ignition timing so as to enable the spark plug to ignite the mixture.

The engine control unit 60 of this embodiment not only detects a misfire by ion current but monitors the combustion condition at each cylinder on the basis of the ion current and executes a learning control of the fuel injection timing.

The result of test showing that the combustion condition can be monitored by the use of ion current will be described hereinlater.

Figure 2:
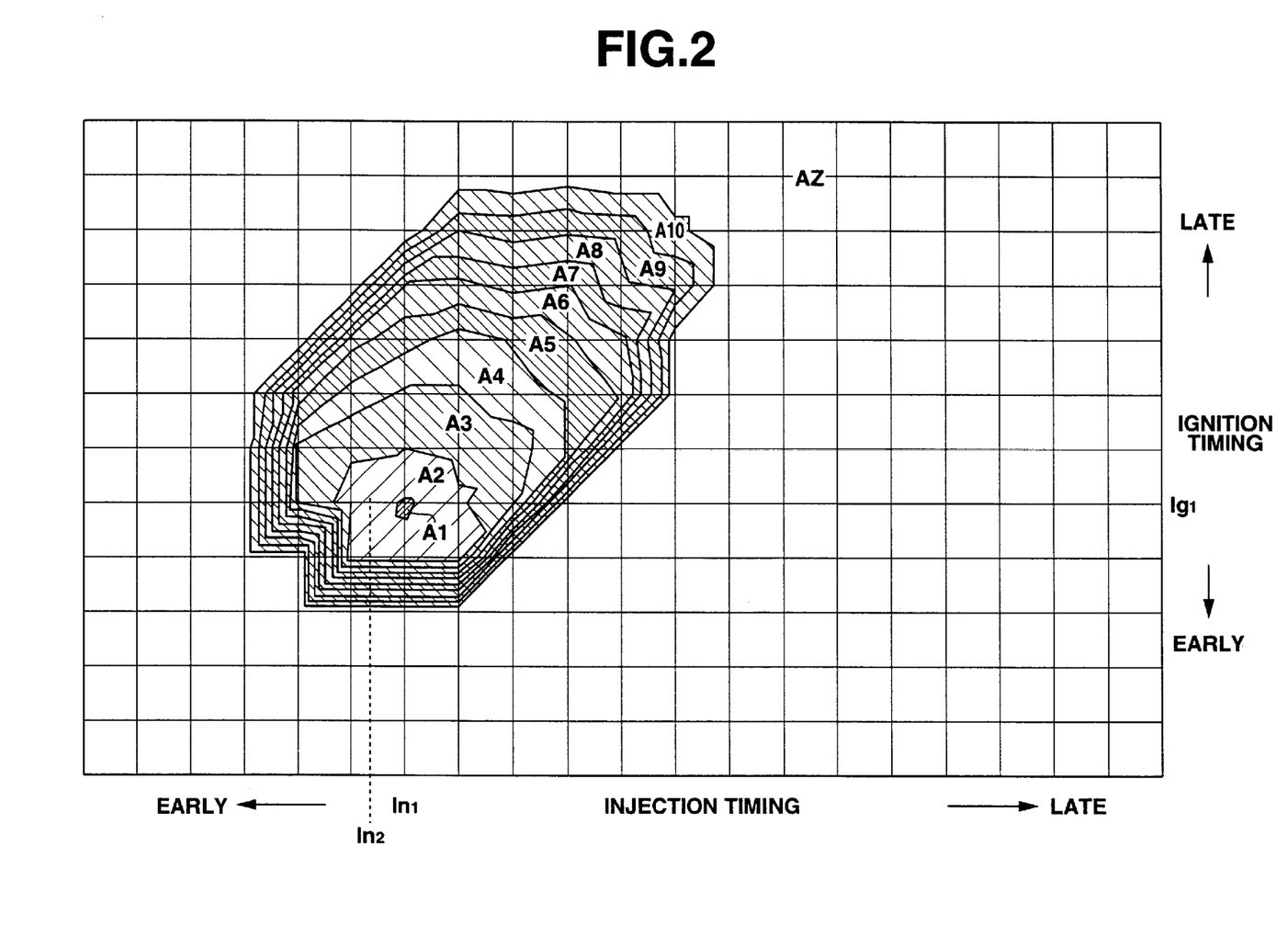
FIG. 2 is a graph showing an average firing pressure within a cylinder, measured in relation to an injection timing and an ignition timing.

FIG. 2 shows the result of measurement of the firing pressure generated within the cylinder. In the graph, the data were plotted, with the fuel injection timing (crank angle) as abscissa and the ignition timing (crank angle) as ordinate, and measurement of the firing pressure was made by varying the injection timing and the ignition timing. In this connection, the injection timing is the timing at which injection is completed and an amount of fuel injected was constant. The measurement was made by setting the engine at a fixed speed and allowing a pressure sensor for measuring the pressure within a cylinder to protrude into the cylinder. The high firing pressure directly indicates that the combustion condition is good.

In FIG. 2, indicated by A1 is an area where the highest firing pressure was generated when, for example, injection of fuel was completed at the crank angle In1 and ignition was executed at the crank angle Ig1. On the other hand, indicated by A2 is an area where a high firing pressure was generated when, for example, injection of fuel was completed at the crank angle In2 and ignition was executed at the crank angle Ig1. The areas from A3 onward, i.e., the areas A3 to A10 indicate the firing pressures which become smaller in this order and each of which becomes smaller by 10 Kpa. On the other hand, the area which is not hatched indicates occurrence of a complete misfire.

Figure 3:
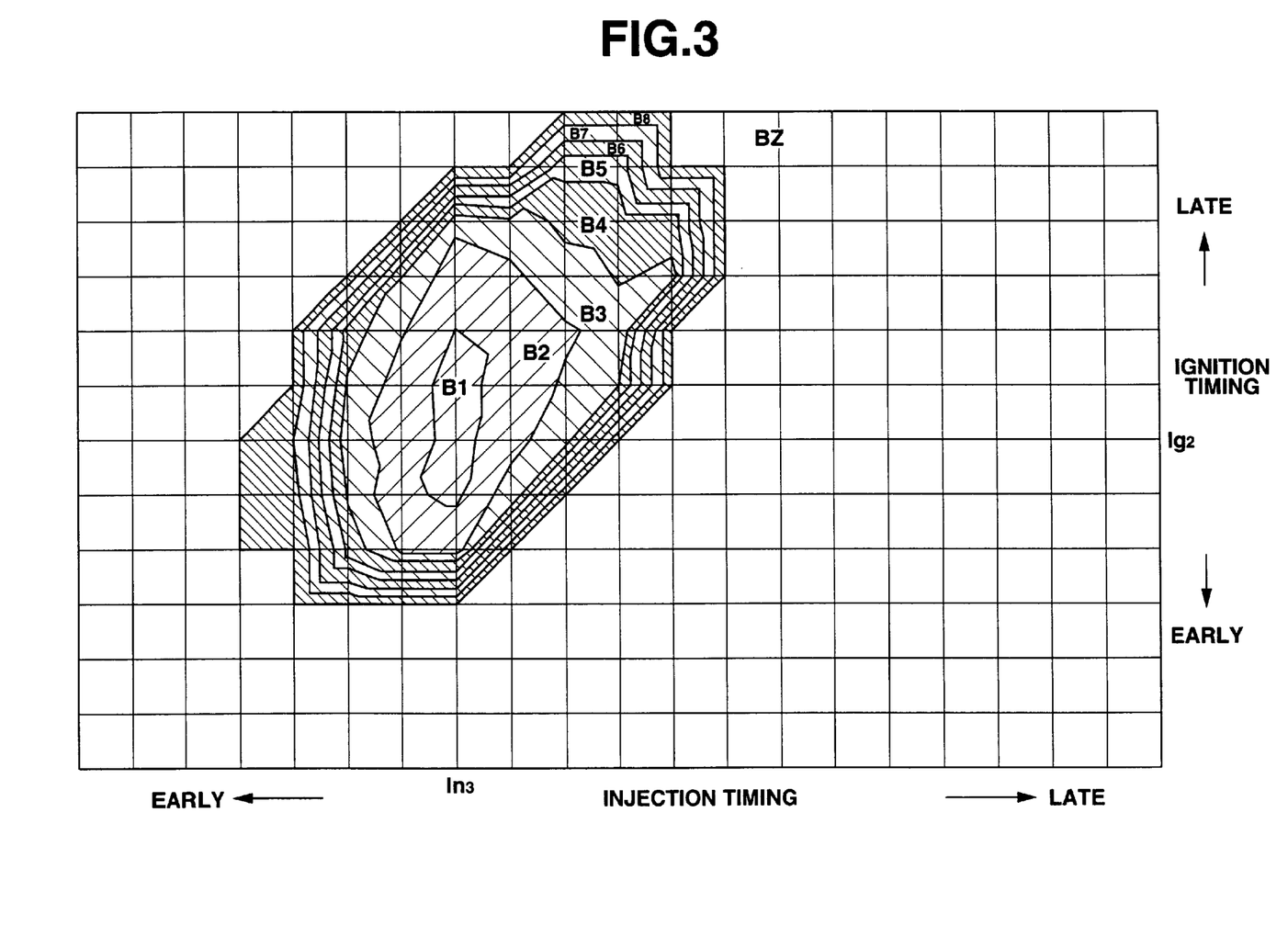
FIG. 3 is a graph showing a coefficient of variation of firing pressure within a cylinder, measured in relation to an injection timing and an ignition timing.

FIG. 3 shows the result of measurement of the coefficient of variation (C.O.V.) of the firing pressure. In this connection, three hundred times of measurements were made at each point to obtain measurement values, and the coefficient of variation was obtained by standard deviation/ average firing pressure integration value (i.e., the result of division obtained by dividing standard deviation by average firing pressure integration value). The measurement condition was the same as in the case of FIG. 2. From this, it will be seen that the lower the coefficient of variation becomes, the stabler the combustion becomes. In FIG. 3, indicated by B1 is the area where the coefficient of variation becomes smallest, i.e., 4 to 6%, when, for example, injection of fuel was completed at the crank angle In3 and ignition was executed at the crank angle Ig2. In the area B2, the coefficient of variation ranges from 6 to 8%. In this graph, the areas from B3 onward, i.e., the areas B3 to B8 indicate the coefficients of variation which became higher in this order and respectively by 2%. On the other hand, the area BZ which is not hatched indicates occurrence of a complete misfire.

Figure 4:
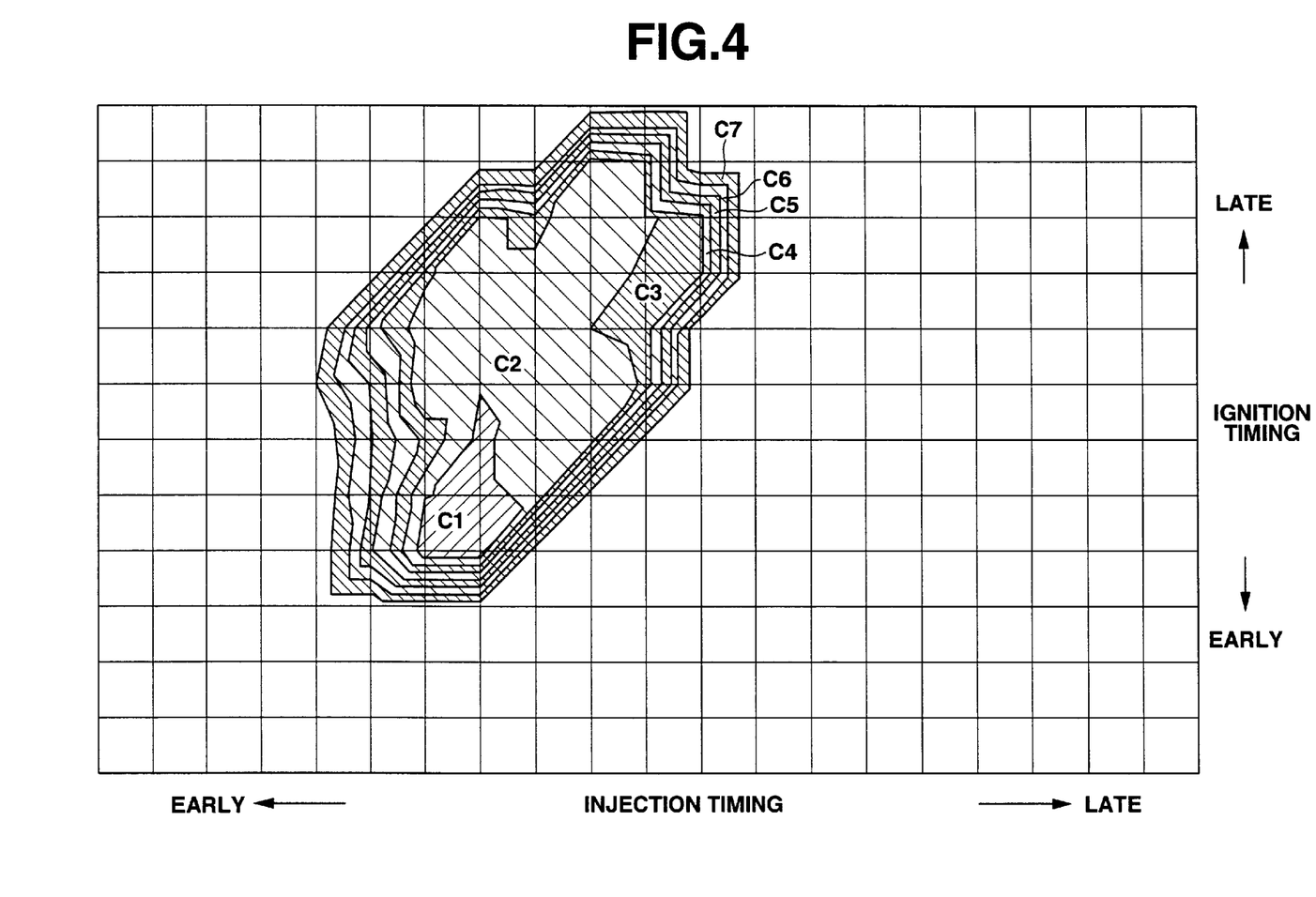
FIG. 4 is a graph showing an average ion current measured in relation to an injection timing and an ignition timing.

FIG. 4 shows an average ion current integration value which was measured under the same condition as that in FIG. 2. In this connection, three hundreds times of measurement were made at each point to obtain the average. In the graph, indicated by C1 is the area where the average value of ion current is highest. Other areas indicate that the average value of ion current reduces gradually in the order of C2, C3 . . . C7. The areas in the graph of FIG. 4 are shaped similarly to those in FIG. 2, i.e., a high average ion current is obtained at such an ignition timing and injection timing that causes a high average firing pressure. Since it has generally been practiced to measure the amount of combustion occurred within the cylinder in terms of ion current, it can be expected that the firing pressure and the ion current have a correlativity. From the graphs of FIGS. 2 and 4, it will be seen that the average ion current corresponds to the average firing pressure.

Referring to the flow charts of FIGS. 7 and 8, a fuel injection timing learning control (feedback control) method by the engine control unit 60, according to the first embodiment will be described.

In this embodiment, at the time the ignition timing is constant, the fuel injection timing is varied to monitor the combustion condition of each cylinder and controlled by the leaning control so as to optimize the combustion condition. Namely, the ignition timing, which is electrically controlled, can be measured and controlled accurately. In contrast to this, the injection timing for injection of fuel which is carried out partly mechanically by an electromagnetic solenoid (not shown), has a difficulty in its accurate measurement and control. For this reason, at the time the detectable ignition timing is constant, the fuel injection timing is advanced or delayed so as to obtain a good combustion condition and obtain an ion current integration value, without measuring the fuel injection timing. Then, the injection timing is controlled so as to make the ion current integration value (average) larger.

Figure 7:
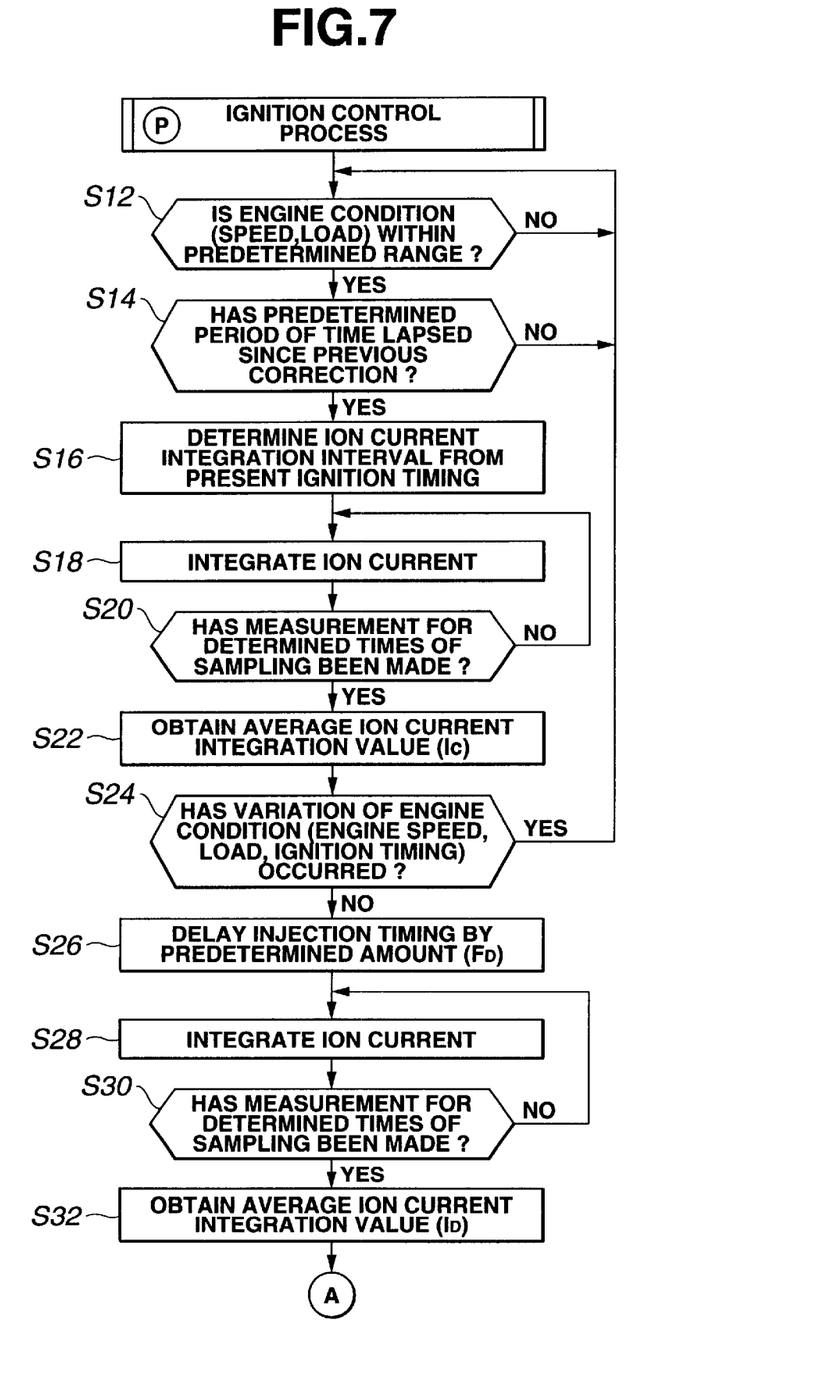
FIG. 7 is a flow chart of a routine performed by the first half of a method of controlling a direct fuel injection engine according to a first embodiment of the present invention.
Figure 8:
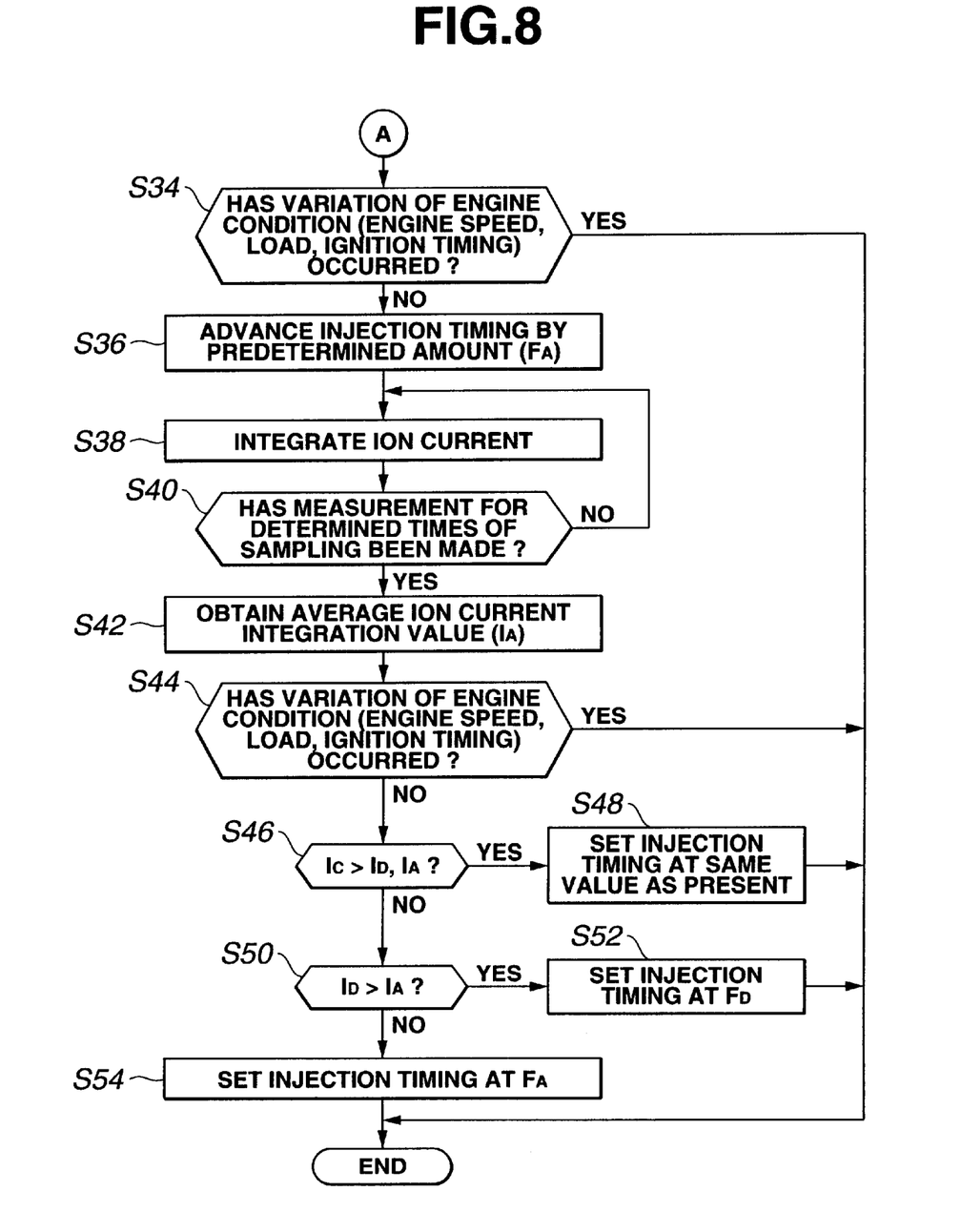
FIG. 8 is a flow chart of a routine executed by a second half of the method of FIG. 7.

Referring to the flow chart of FIG. 7, in step S12, the engine control unit 60 judges if the engine conditions (engine speed and load) is constant (within a predetermined range). Specifically, it is judged if the vehicle with the engine system of this embodiment is cruising at high speed (i.e., running continuously at the speed from 80 to 100 Km/h without requiring the necessity of changing the ignition timing). When the judgement is Yes, the program proceeds to step S14 where it is judged if a predetermined period of time has lapsed since a previous injection timing correction. Since adjustment of the injection timing is made in response to an aged variation of the electromagnetic solenoid, it is not necessary to carry out adjustment of the injection timing so frequently. For this reason, it is judged if one year or more has passed after the previous injection timing adjustment (correction).

When one year or more has lapsed since the previous correction, the program proceeds to step S16 where the integration interval (number of times of sampling) for integrating the ion current is determined from the present ignition timing. In step S18, the ion current at the present injection timing is measured and integrated to obtain its integration value. In step S20, it is judged if measurement for determined times of sampling has been made. When the judgment is Yes, the program proceeds to step S22 to obtain an average ion current integration value Ic at the present injection timing by dividing the ion current integration value by the number of times of sampling. In step S24, it is judged if a variation of the engine condition (engine speed, load and ignition timing) has occurred after start of measurement. When a variation of one of engine speed, load and ignition timing has occurred, the program returns back to step S12 to make measurement again since the measured value obtained by the above steps is not reliable.

On the other hand, in case of judgment that the engine speed, load and ignition timing have been constant, the program proceeds to step S26 where the fuel injection timing is delayed by a predetermined amount (i.e., a crank angle of 5 degrees). Namely, the injection timing is set at a delayed timing $F_D$. In step S28, ion current is measured and integrated to obtain its integration value. In step S30, it is judged if measurement for the determined times of sampling has been made. When the judgment is Yes, the program proceeds to step S32 where an average ion current integration value $I_D$ at the delayed injection timing $F_D$, i.e., injection timing delayed by a crank angle of 5 degrees, is obtained by dividing the ion current integration value by the number of times of sampling. Then, the program proceeds to step S34 in FIG. 8 to judge if a variation of the engine condition (engine speed, load and ignition timing) has occurred after start of measurement. When a variation of one of engine speed, load and ignition timing has occurred (i.e., in case the judgment in step S34 is Yes), the process is ended.

When the judgment in step S34 is No, i.e., it is judged that the engine speed, load and ignition timing have been constant, the program proceeds to step S36 where the fuel injection timing is advanced by a predetermined amount (i.e., a crank angle of 5 degrees). Namely, the injection timing is set at an advanced timing $F_A$ which is advanced by a crank angle of 5 degrees as compared with the present injection timing. In step S38, the ion current is measured and integrated to obtain its integration value. In step S40, it is judged if measurement for the determined times of sampling has been made. When the judgment is Yes, the program proceeds to step S42 where an average ion current integration value $I_A$ at the injection timing advanced by a crank angle of 5 degrees is obtained by dividing the ion current integration value by the number of times of sampling. In step S44, it is judged if a variation of the engine condition (engine speed, load and ignition timing) has occurred after start of measurement. When a variation of one of engine speed, load and ignition timing has occurred, the process is ended. On the other hand, when not, the program proceeds to step S46 to judge if the average ion current integration value $I_C$ at the present injection timing is larger than the average ion current integration value $I_D$ at the delayed injection timing $F_D$ delayed by a crank angle of 5 degrees and the average ion current integration value $I_A$ at the advanced injection timing $F_A$ advanced by a crank angle of 5 degrees. When the judgement is Yes, the program proceeds to step S48 where the injection timing is judged as being proper and set at the same value as present. On the other hand, when the judgement is No, the program proceeds to step S50 where it is judged if the average ion current integration value $I_D$ at the delayed timing $F_D$ is larger than the average ion current integration value $I_A$ at the advanced injection timing $F_A$. When the judgement in step S50 is Yes, the program proceeds to step S52 where the fuel injection timing is set at the delayed timing $F_D$. On the contrary, when the judgement in step S50 is No, the program proceeds to step S54 where the injection timing is set at the advanced timing $F_A$. BY the foregoing control, a process for one cylinder is completed and the same process is executed for the next cylinder. That is, in case of a 6-cylinder engine as in this embodiment, a learning control of fuel injection timings for the respective electromagnetic solenoids for six cylinders is executed sequentially. By the direct fuel injection engine control method according to the first embodiment, when the ignition timing which can be measured accurately is constant, the fuel injection timing is advanced or delayed so as to maximize the average ion current. Accordingly, even if the electromagnetic solenoid is deteriorated to lower its efficiency and vary the injection timing, it becomes possible to make a control or adjustment for optimizing the injection timing and therefore make the direct fuel injection engine maintain an intended performance or efficiency over a long period of usage. In the meantime, by the control method of this embodiment, it becomes possible to cope with a variation of the engine efficiency resulting not only from an aged deterioration of an electromagnetic solenoid but a variation of the engine efficiency at the initial period of usage of the engine. Particularly, since the control method of this embodiment can be realized by using a known ion current detecting circuit and storing the program for the above described learning control (i.e., feedback control) in the ROM 64, the device for carrying out the control method of this embodiment can be obtained at low cost.

A direct fuel injection engine control method according to a second embodiment of the present invention will be described. In the above described first embodiment, the fuel injection timing is controlled on the basis of an average ion current. In contrast to this, in the direct fuel injection engine control method of the second embodiment, the injection timing is controlled on the basis of the coefficient of variation (C.O.V.) of ion current. Since the mechanical structure of the engine system for the control method of the second embodiment is substantially the same as that of the first embodiment, repeated description thereto is omitted for brevity.

Figure 5:
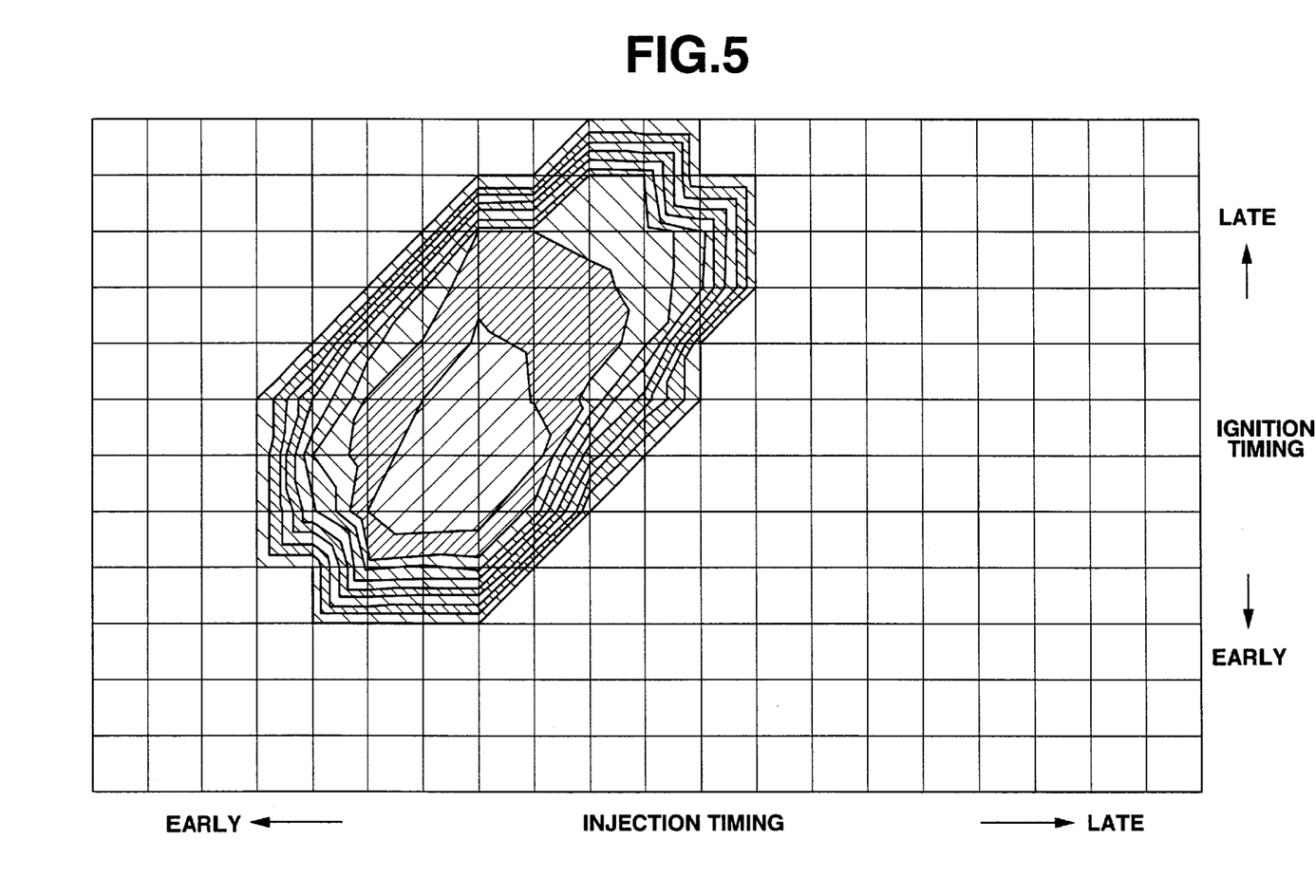
FIG. 5 is a graph of a coefficient of variation of ion current measured in relation to an injection timing and an ignition timing.

FIG. 5 shows the result of measurement of the coefficient of variation (C.O.V.) of ion current. In this connection, three hundred times of measurements were made at each point to obtain measurement values, and the coefficient of variation was obtained by standard deviation/average firing pressure integration value (i.e., by dividing the standard deviation by the average firing pressure integration value). The measurement condition was the same as in the case of FIGS. 2 to 4. In the graph of FIG. 5, each area is similarly shaped as that in FIG. 3, i.e., the injection timing and ignition timing that cause the low coefficient of variation of the firing pressure correspond to those that cause the low coefficient of variation of ion current. From this graph, it will be understood that the combustion condition can be judged on the basis of the coefficient of variation of ion current.

Figure 9:
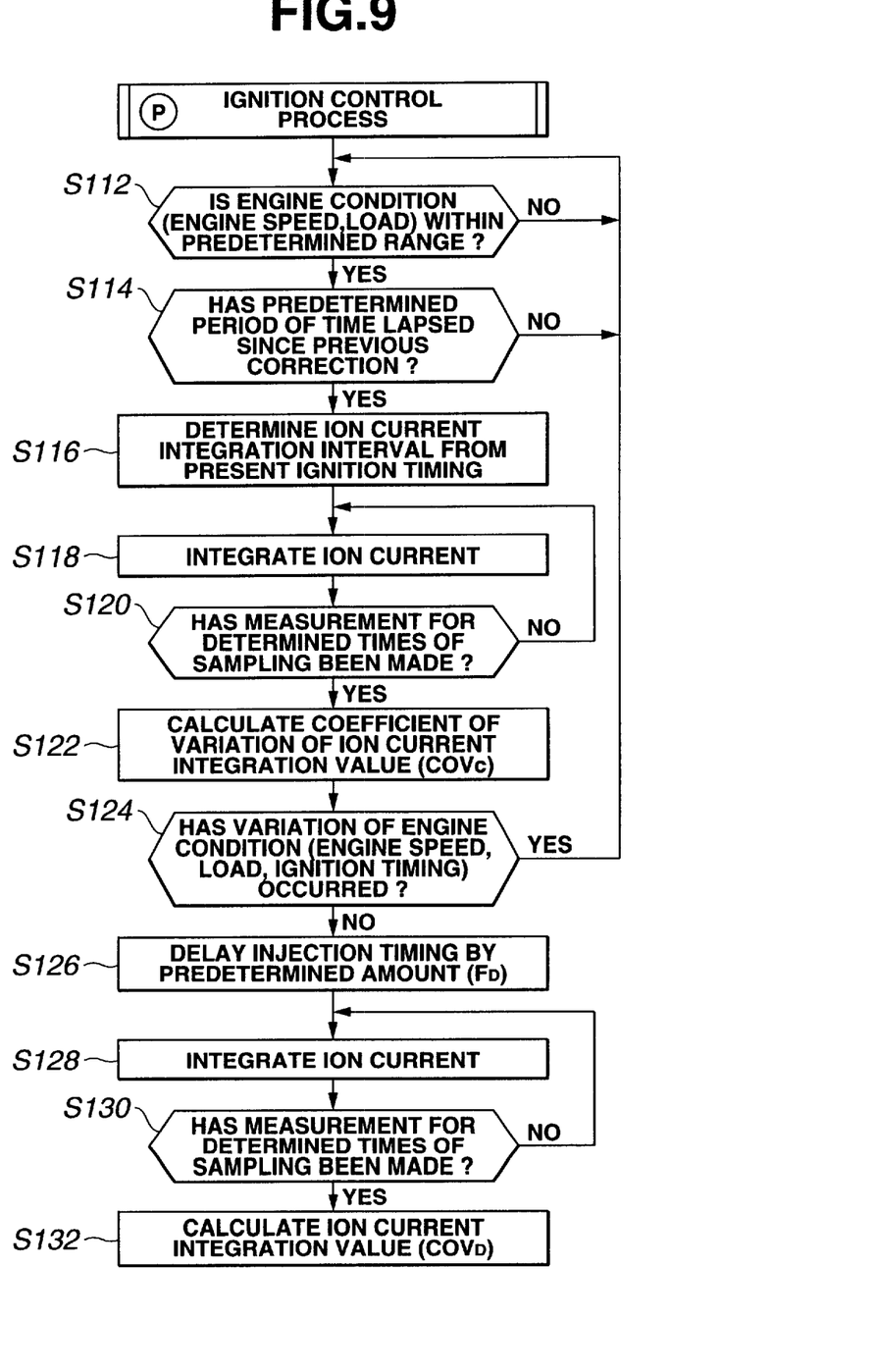
FIG. 9 is a flow chart of a routine executed by a first half of a method of controlling a direct fuel injection engine according to a second embodiment of the present invention.
Figure 10:
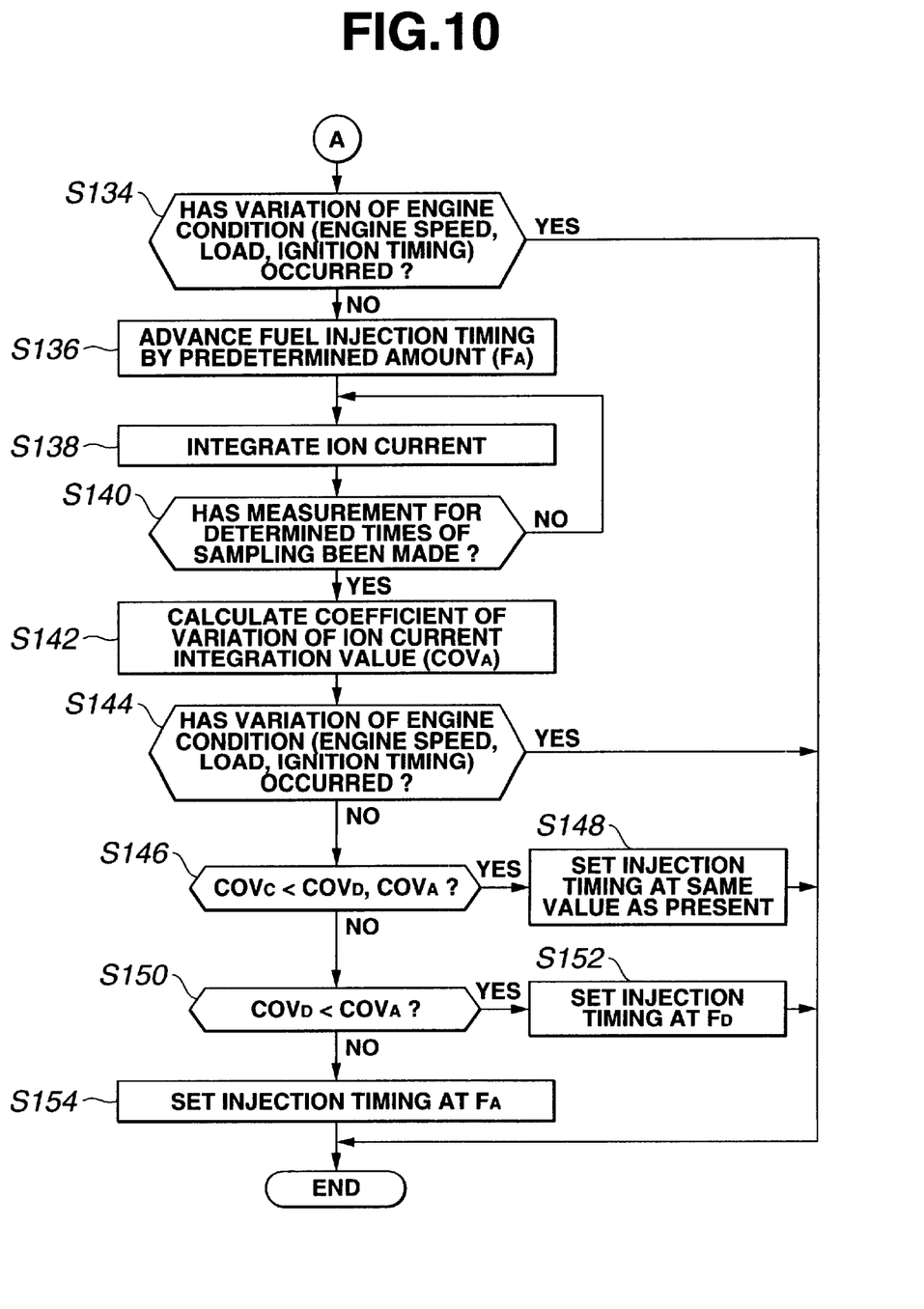
FIG. 10 is a flow chart of a routine executed by a second half of the method of FIG. 9.

Referring to the flow charts of FIGS. 9 and 10, a fuel injection timing learning control method by the engine control unit 60 according to the second embodiment will be described.

In this embodiment, when the ignition timing is constant, the fuel injection timing is changed to monitor the combustion condition of each cylinder and the injection timing is controlled so as to optimize the combustion condition.

Firstly, in step S112, it is judged by the engine control unit 60 if the engine condition (engine speed and load) is constant (i.e., within a predetermined range). When the judgement is yes, the program proceeds to step S114 where it is judged if a set period (e.g., one year) has elapsed since the previous correction of injection timing.

When the judgement in step S114 is Yes, the program proceeds to step S116 where the integration interval (i.e., number of times of sampling) for integrating the ion current is determined from the present ignition timing. In step S118, the ion current at the present injection timing is measured and integrated to obtain its integration value. In step S120, it is judged if measurement for determined times of sampling has been made. When the judgement is Yes, the program proceeds to step S122 where a coefficient of variation ($COV_c$) of the ion current integration value at the present injection timing is calculated. In step S124, it is judged if a variation of the engine condition (engine speed, load and ignition timing) has occurred after start of measurement.

When the judgement in step S124 is No, i.e., the engine speed, load and ignition timing have been constant, the injection timing is delayed. Specifically, the fuel injection timing is delayed by a predetermined amount (i.e., a crank angle of 5 degrees). Namely, the fuel injection timing is set a delayed timing $F_D$. In step 128, the ion current at the delayed injection timing $F_D$ is measured and integrated to obtain its integration value. In step 130, it is judged if measurement for determined times of sampling has been made. When the judgement is Yes, the program proceeds to the step S132 where the coefficient of variation $COV_D$ of ion current at the delayed injection timing $F_D$ is calculated from the ion current integration value. In step S134 of FIG. 10, it is judged if a variation of the engine condition (engine speed, load and ignition timing) has occurred after start of measurement.

When the judgment in step S134 is No, the program proceeds to the step S136 where the fuel injection timing is advanced by a predetermined amount (i.e., a crank angle of 5 degrees). Namely, the fuel injection timing is set at an advanced timing $F_A$. In step S138, the ion current at the advanced injection timing $F_A$ is measured and integrated to obtain its integration value. In step S140, it is judged if measurement for determined times of sampling has been made. When the judgement is Yes, the program proceeds to step S142 where the coefficient of variation $COV_A$ of the ion current integration value at the advanced injection timing $F_A$ is calculated. In step S144, it is judged if a variation of the engine condition (engine speed, load and ignition timing) has occurred after start of measurement. When the judgment is No, the program proceeds to step S146 where it is judged if the coefficient of variation $COV_C$ of the ion current integration value at the present injection timing is smaller than the coefficient of variation $COV_D$ of the ion current integration value at the delayed injection timing $F_D$ and the coefficient of variation $COV_A$ of the ion current integration value at the advanced injection timing $F_A$. When the judgement is Yes, the program proceeds to step S148 where the fuel injection timing is judged as being proper and set at the same value as present. On the other hand, when the judgement is No, the program proceeds to step S150 where it is judged if the coefficient of variation $COV_D$ of the ion current integration value at the delayed injection timing $F_D$ is smaller than the coefficient of variation $COV_A$ of the ion current integration value at the advanced injection timing $F_A$. When the judgment is Yes, the program proceeds to step S152 where the injection timing is set at the delayed timing $F_D$. On the contrary, when the judgement is No, the program proceeds to step S154 where the injection timing is set at the advanced timing $F_A$ and the process is ended.

In the direct fuel injection engine control method according to the second embodiment, the fuel injection timing is advanced or delayed when the ignition timing which is accurately detectable is constant, so as to minimize the coefficient of variation of ion current. Accordingly, even when the solenoid is deteriorated to lower its efficiency and cause a variation of injection timing, the injection timing can be controlled so as to be optimized, thus making it possible to maintain an intended efficiency or performance of a direct fuel injection engine over a long period of usage. Particularly, the control method of this invention can be realized by using a conventional ion current detecting circuit for detection of a misfire and by storing the program for the above described learning control in a ROM, so the apparatus for carrying out the control method can be obtained at low cost.

Figure 11:
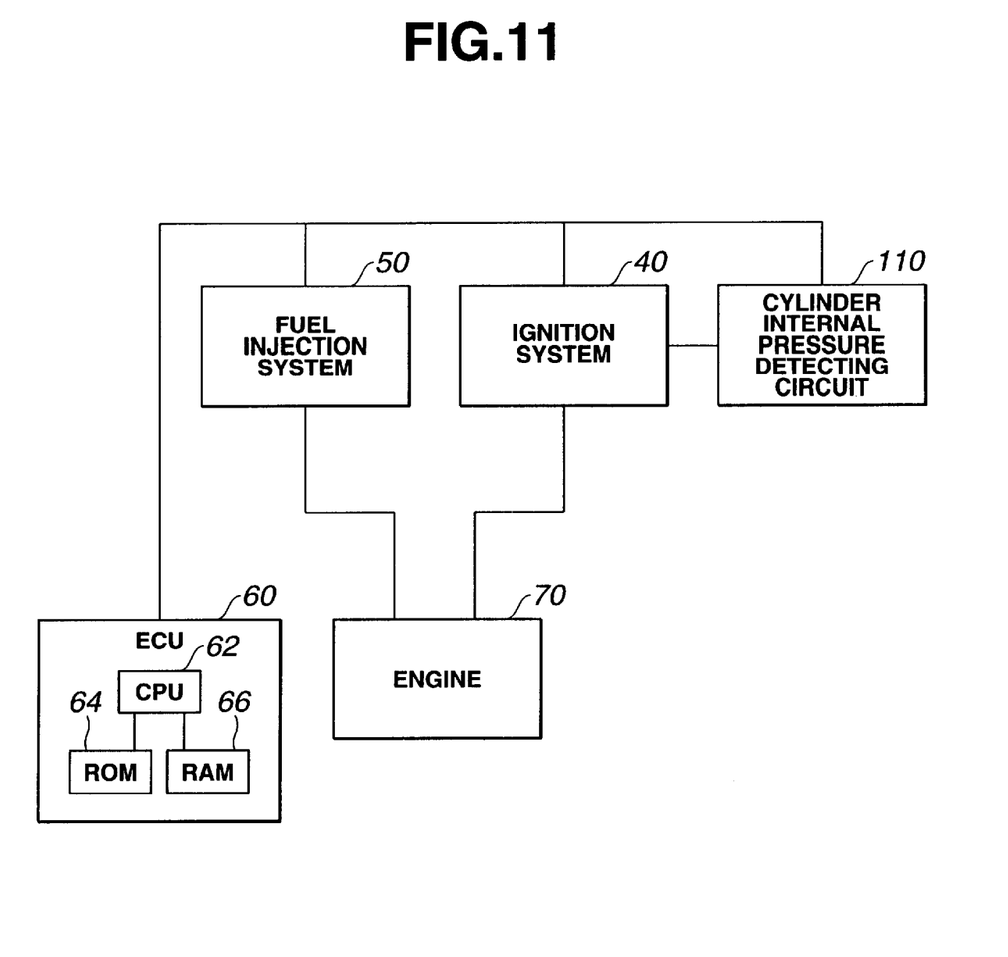
FIG. 11 is a block diagram of an engine system wherein a method of controlling a direct fuel injection engine according to a third embodiment of the present invention is used.
Figure 12:
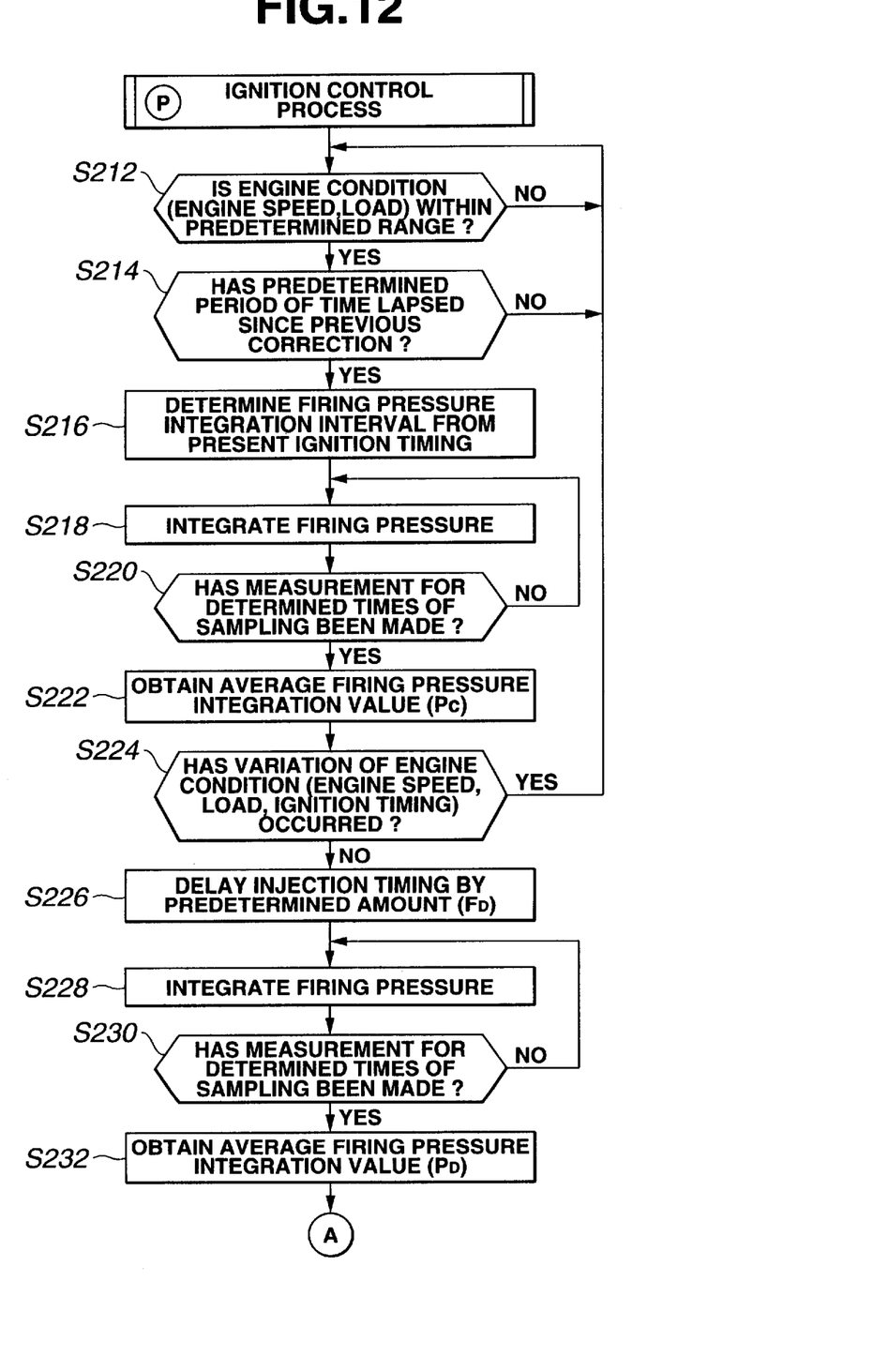
FIG. 12 is a flow chart of a routine executed by a first half of a method of controlling a direct fuel injection engine according to a third embodiment of the present invention.
Figure 13:
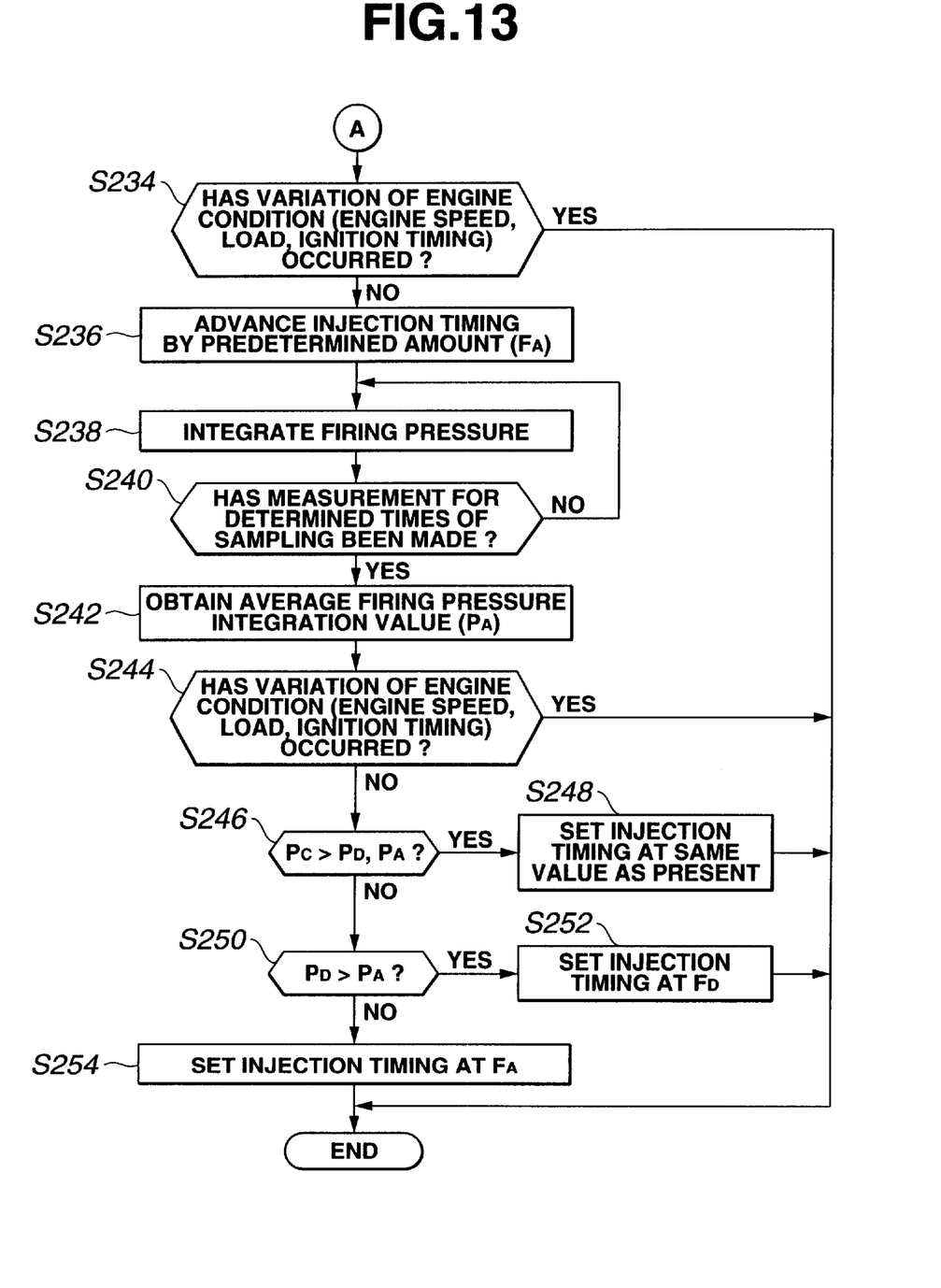
FIG. 13 is a flow chart of a routine executed by a second half of the method of FIG. 12.

Referring to FIGS. 11 to 13, the third embodiment will be described. FIG. 11 shows an engine system in which a direct fuel injection engine control method according to the third embodiment is used. In the above described first and second embodiments, detection of the combustion condition is carried out by the use of the ion current detecting circuit 10 for detection of misfire. In contrast to this, in the third embodiment, the firing pressure is measured by a pressure sensor disposed in each cylinder, whereby to carry out a learning control of a fuel injection timing. The pressure sensor is structured so as to constitute a washer of a spark plug and is capable of measuring a firing pressure within a cylinder. The engine system of the third embodiment is provided with a cylinder internal pressure detecting circuit 110 for detecting a pressure within a cylinder, which converts the pressure measured by the pressure sensor into a signal, so that the engine control unit 60 monitors the combustion condition of each cylinder on the basis of the signal from the cylinder internal pressure detecting circuit 110.

FIGS. 12 and 13 show a learning control of fuel injection timing by a direct fuel injection engine control method according to the third embodiment of the present invention.

Firstly, in step S212, it is judged by the engine control unit 60 if the engine condition (engine speed and load) is within a predetermined range. When the judgement is yes, the program proceeds to step S214 where it is judged if a set period (e.g., one year) has elapsed since the previous correction of injection timing. When the judgement is Yes, the program proceeds to step S216 to determine the integration interval (number of times of sampling) for integrating the ion current from the present ignition timing. In step S218, the firing pressure at the present fuel injection timing is measured and integrated to obtain its integration value. In step S220, it is judged if measurement for determined times of sampling has been made. When the judgement is Yes, the program proceeds to step S222 where an average firing pressure Pc at the present fuel injection timing is obtained by dividing the firing pressure integration value by the number of times of sampling. In step S224, it is judged if a variation of the engine condition (engine speed, load and ignition timing) has occurred after start of measurement.

When the judgement in step S224 is No, i.e., the engine speed, load and ignition timing have been constant, the program proceeds to step S226 where the injection timing is delayed by a predetermined amount (i.e., a crank angle of 5 degrees). Namely, the fuel injection timing is set at a delayed timing $F_D$. In step 228, the firing pressure at the delayed injection timing $F_D$ is measured and integrated to obtain its integration value. In step 230, it is judged if measurement for determined times of sampling has been made. When the judgement is Yes, the program proceeds to step S232 where an average firing pressure $P_D$ at the delayed injection timing $F_D$ is obtained by dividing the firing pressure integration value by the number of times of sampling.

Then, in step S234, it is judged if a variation of the engine condition (engine speed, load and ignition timing) has occurred. When the judgement is No, the program proceeds to step S236 where the fuel injection timing is set at an advanced timing $F_A$ which is advanced by a predetermined amount (i.e., a crank angle of 5 degrees) as compared with the present injection timing. In step S238, the firing pressure is measured and integrated to obtain its integration value. In step S240, it is judged if measurement for the determined times of sampling has been made. When the judgement is Yes, the program proceeds to step S242 where an average firing pressure $P_A$ at the advanced injection timing $F_A$ is obtained by dividing the firing pressure integration value by the number of times of sampling. In step S244, it is judged if a variation of the engine condition (engine speed, load and ignition timing) has occurred. When the judgment is No, the program proceeds to step S246 where it is judged if the average firing pressure $P_C$ at the present injection timing is larger than the average firing pressure $P_D$ at the delayed injection timing $F_D$ and the average firing pressure $P_A$ at the advanced injection timing $F_A$. When the judgement is Yes, the program proceeds to step S248 where the fuel injection timing is judged as being proper and set at the same value as present. On the other hand, when the judgement is No, the program proceeds to step S250 where it is judged if the average firing pressure $P_D$ at the delayed injection timing $F_D$ is larger than the average firing pressure $P_A$ at the advanced injection timing $F_A$. When the judgment is Yes, the program proceeds to step S252 where the injection timing is set at the delayed timing $F_D$. On the contrary, when the judgement is No, the program proceeds to step S254 where the injection timing is set at the advanced timing $F_A$ and the process is ended.

In the direct fuel injection engine control method according to the third embodiment, the fuel injection timing is advanced or delayed when the ignition timing which is accurately detectable is constant, so as to maximize the average firing pressure. Accordingly, even when the efficiency of the solenoid is lowered to cause a variation of injection timing, the injection timing can be adjusted to be optimized, thus making it possible to maintain an intended efficiency of a direct fuel injection engine over a long period of usage. Particularly, since the pressure sensor is used only for measurement of the firing pressure, the firing pressure can be measured accurately.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A direct fuel injection engine control system comprising:

means for varying a fuel injection timing under a condition where an ignition timing is constant;

means for monitoring a combustion condition of each cylinder before and after said varying of the fuel injection timing; and means for controlling the fuel injection timing in accordance with a variation of the combustion condition before and after said varying of the fuel injection timing.

2. A storage medium storing a method of controlling a direct fuel injection engine with spark plug, including, under a condition where an ignition timing is constant, varying a fuel injection timing, monitoring a combustion condition of each cylinder before and after said varying of the fuel injection timing, and controlling the fuel injection timing in accordance with a variation of the combustion condition before and after said varying of the fuel injection timing.

3. A direct fuel injection engine learning control method comprising:

when an ignition timing is constant, monitoring an average ion current at each cylinder and controlling a fuel injection timing so as to maximize the average ion current.

4. A direct fuel injection engine learning control method comprising:

when an ignition timing is constant, monitoring a coefficient of variation of ion current at each cylinder and controlling a fuel injection timing so as to minimize the coefficient of variation of ion current.

5. A direct fuel injection engine learning control method comprising:

when an ignition timing is constant, monitoring an average firing pressure at each cylinder and controlling a fuel injection timing so as to maximize the firing pressure.

6. A method of controlling a direct fuel injection engine with spark ignition, comprising:

under a condition where an ignition timing is constant, varying a fuel injection timing;

monitoring a combustion condition of each cylinder before and after said varying of the fuel injection timing; and controlling the fuel injection timing in accordance with a variation of the combustion condition before and after said varying of the fuel injection timing.

7. The method according to claim 6, wherein said monitoring of the combustion condition of each cylinder comprises detecting an ion current at each cylinder.

8. The method according to claim 7, wherein said controlling of the fuel injection timing comprises maximizing at least one of the ion current and characteristic parameters of the ion current.

9. The method according to claim 7, wherein said controlling of the fuel injection timing comprises minimizing a coefficient of variation of one of the ion current and characteristic parameters of the ion current.

10. The method according to claim 6, wherein said monitoring of the combustion condition of each cylinder comprises detecting a firing pressure at each cylinder.

11. The method according to claim 10, wherein said controlling of the fuel injection timing comprises maximizing the firing pressure at each cylinder.

* * * * *